US012657841B2

(12) United States Patent
Francis et al.

(10) Patent No.: US 12,657,841 B2
(45) Date of Patent: Jun. 16, 2026

(54) EXTENSIBLE IMAGE MODELING FOR SERVICES

(71) Applicant: NCR Voyix Corporation, Atlanta, GA (US)

(72) Inventors: Barrett Evan Francis, Berkeley Lake, GA (US); James Christopher Koch, Atlanta, GA (US); Danyun Yu, Naperville, IL (US)

(73) Assignee: NCR Voyix Corporation, Atlanta, GA (US)

( * ) Notice: Subject to any disclaimer, the term of this patent is extended or adjusted under 35 U.S.C. 154(b) by 87 days.

(21) Appl. No.: 18/385,660

(22) Filed: Oct. 31, 2023

(65) Prior Publication Data

US 2025/0139905 A1 May 1, 2025

(51) Int. Cl.
*G06T 19/00* (2011.01)
*G06Q 30/0601* (2023.01)
*G06T 5/77* (2024.01)

(52) U.S. Cl.
CPC ....... *G06T 19/006* (2013.01); *G06Q 30/0643* (2013.01); *G06T 5/77* (2024.01); *G06T 2207/10024* (2013.01); *G06T 2207/10028* (2013.01)

(58) Field of Classification Search
CPC ..................... G06T 19/006; G06T 5/77; G06T 2207/10024; G06T 2207/10028; G06Q 30/0643
USPC ......................................................... 345/419
See application file for complete search history.

(56) References Cited

U.S. PATENT DOCUMENTS

| | | | | |
|---|---|---|---|---|
| 2017/0094254 A1* | 3/2017 | Lee | ......................... | H04N 13/30 |
| 2021/0166426 A1* | 6/2021 | Mccormac | ........... | G05D 1/2437 |
| 2023/0401802 A1* | 12/2023 | Maschmeyer | ...... | G06F 3/04842 |
| 2025/0029347 A1* | 1/2025 | Marcusanu | ............. | G06F 30/13 |

* cited by examiner

*Primary Examiner* — Jin Ge
(74) *Attorney, Agent, or Firm* — Schwegman Lundberg & Woessner, P.A.

(57) ABSTRACT

Three-dimensional (3D) images of a physical environment is obtained. The 3D images are modeled as a 3D data set with real-world objects depicted within the 3D data set. The objects are categorized into independent layers of the physical environment. Each layer is independently modified or enhanced to correct missing image information and image blemishes. The image data of 3D data set is updated with the corrected layers. The 3D data set and the independent layers are associated together as an extensible image data model. The extensible image data model is provided via interfaces to simulate object layout changes within the physical environment and to provide virtual reality (VR) and/or augmented reality (AR) shopping experiences through interfaces.

7 Claims, 3 Drawing Sheets

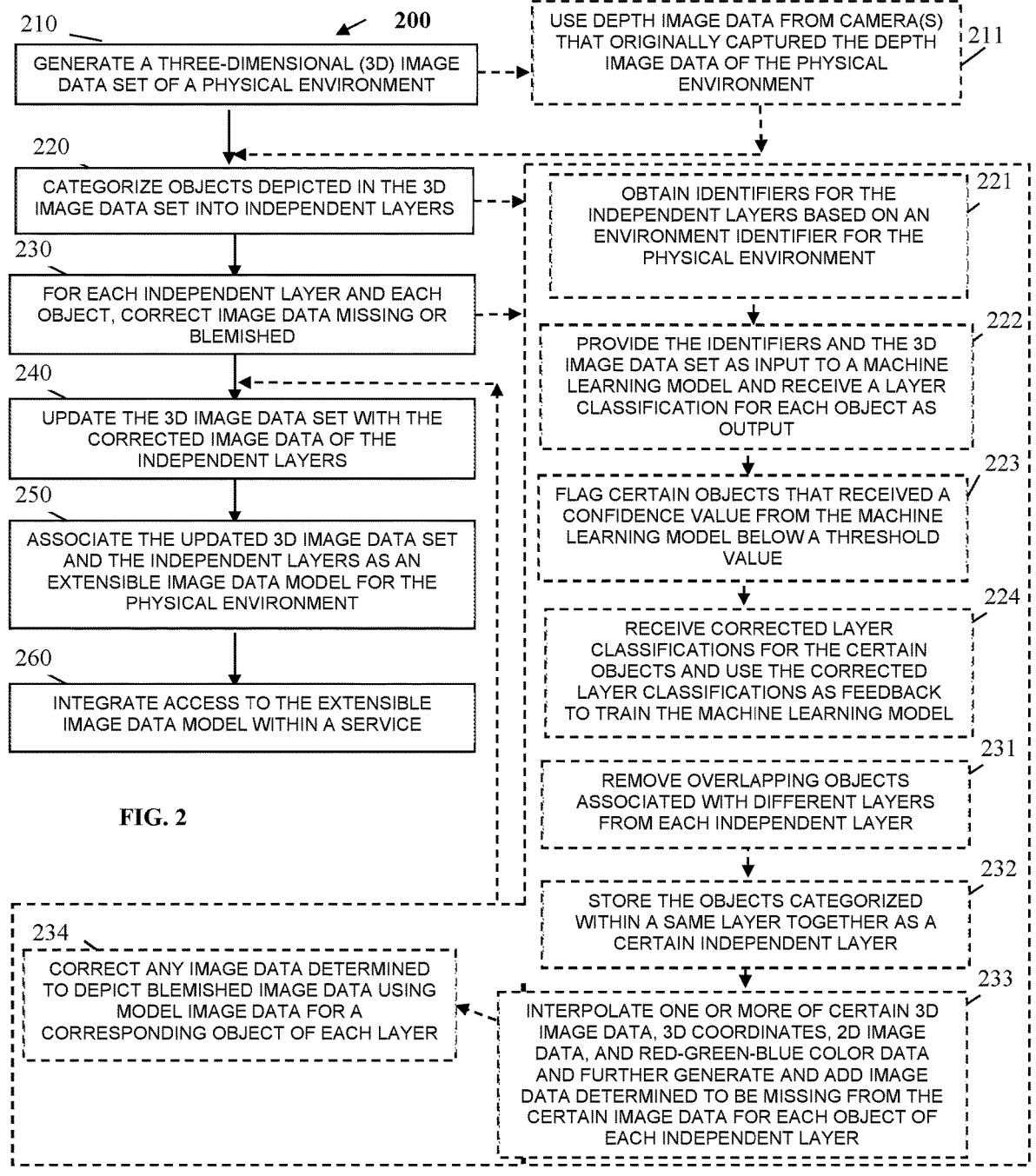

210

GENERATE A THREE-DIMENSIONAL (3D) IMAGE DATA SET OF A PHYSICAL ENVIRONMENT

200

USE DEPTH IMAGE DATA FROM CAMERA(S) THAT ORIGINALLY CAPTURED THE DEPTH IMAGE DATA OF THE PHYSICAL ENVIRONMENT 211

220

CATEGORIZE OBJECTS DEPICTED IN THE 3D IMAGE DATA SET INTO INDEPENDENT LAYERS

230

FOR EACH INDEPENDENT LAYER AND EACH OBJECT, CORRECT IMAGE DATA MISSING OR BLEMISHED

240

UPDATE THE 3D IMAGE DATA SET WITH THE CORRECTED IMAGE DATA OF THE INDEPENDENT LAYERS

250

ASSOCIATE THE UPDATED 3D IMAGE DATA SET AND THE INDEPENDENT LAYERS AS AN EXTENSIBLE IMAGE DATA MODEL FOR THE PHYSICAL ENVIRONMENT

260

INTEGRATE ACCESS TO THE EXTENSIBLE IMAGE DATA MODEL WITHIN A SERVICE

FIG. 2

OBTAIN IDENTIFIERS FOR THE INDEPENDENT LAYERS BASED ON AN ENVIRONMENT IDENTIFIER FOR THE PHYSICAL ENVIRONMENT 221

PROVIDE THE IDENTIFIERS AND THE 3D IMAGE DATA SET AS INPUT TO A MACHINE LEARNING MODEL AND RECEIVE A LAYER CLASSIFICATION FOR EACH OBJECT AS OUTPUT 222

FLAG CERTAIN OBJECTS THAT RECEIVED A CONFIDENCE VALUE FROM THE MACHINE LEARNING MODEL BELOW A THRESHOLD VALUE 223

RECEIVE CORRECTED LAYER CLASSIFICATIONS FOR THE CERTAIN OBJECTS AND USE THE CORRECTED LAYER CLASSIFICATIONS AS FEEDBACK TO TRAIN THE MACHINE LEARNING MODEL 224

REMOVE OVERLAPPING OBJECTS ASSOCIATED WITH DIFFERENT LAYERS FROM EACH INDEPENDENT LAYER 231

STORE THE OBJECTS CATEGORIZED WITHIN A SAME LAYER TOGETHER AS A CERTAIN INDEPENDENT LAYER 232

233
INTERPOLATE ONE OR MORE OF CERTAIN 3D IMAGE DATA, 3D COORDINATES, 2D IMAGE DATA, AND RED-GREEN-BLUE COLOR DATA AND FURTHER GENERATE AND ADD IMAGE DATA DETERMINED TO BE MISSING FROM THE CERTAIN IMAGE DATA FOR EACH OBJECT OF EACH INDEPENDENT LAYER

234
CORRECT ANY IMAGE DATA DETERMINED TO DEPICT BLEMISHED IMAGE DATA USING MODEL IMAGE DATA FOR A CORRESPONDING OBJECT OF EACH LAYER

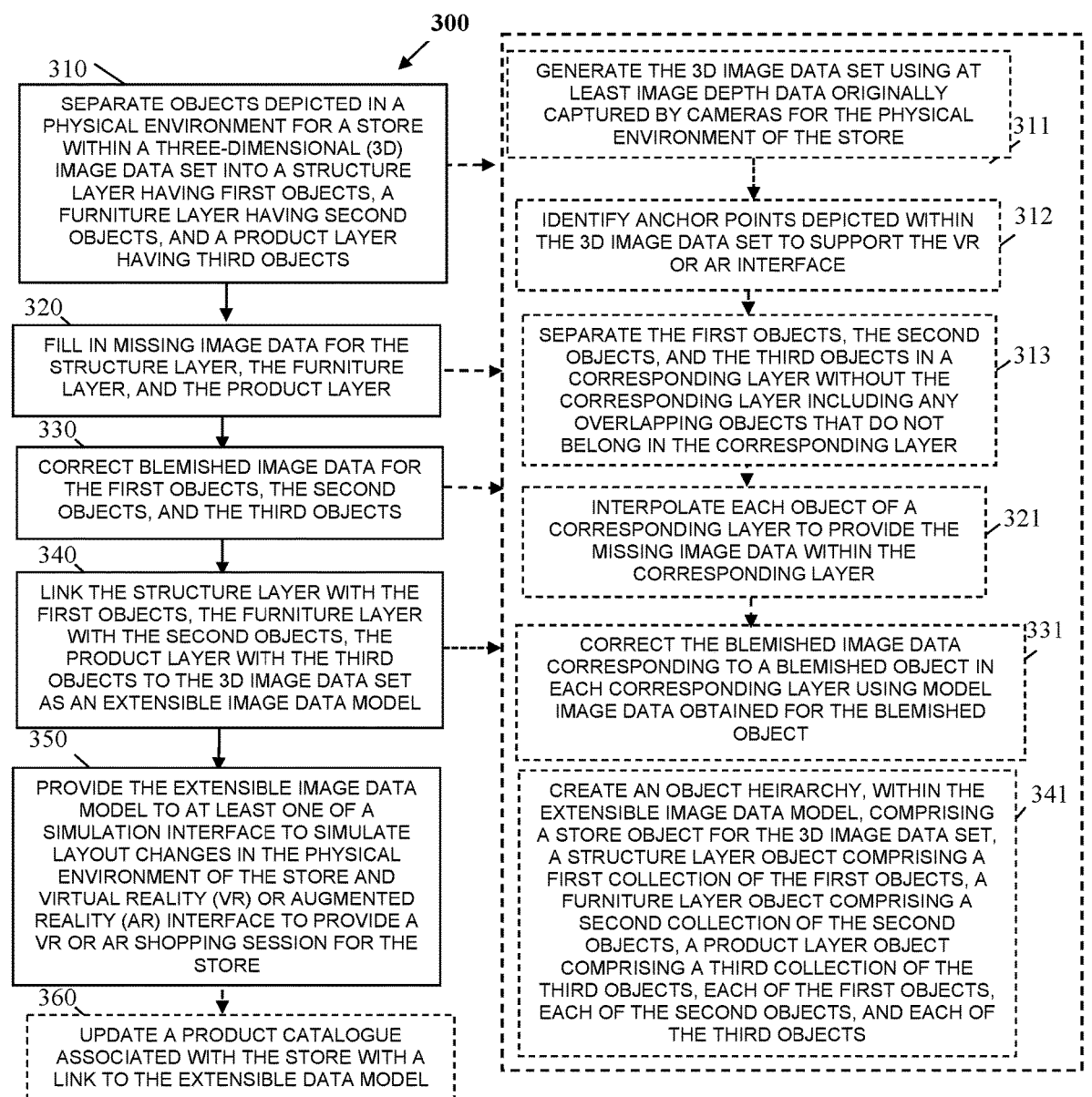

300

310
SEPARATE OBJECTS DEPICTED IN A PHYSICAL ENVIRONMENT FOR A STORE WITHIN A THREE-DIMENSIONAL (3D) IMAGE DATA SET INTO A STRUCTURE LAYER HAVING FIRST OBJECTS, A FURNITURE LAYER HAVING SECOND OBJECTS, AND A PRODUCT LAYER HAVING THIRD OBJECTS

320
FILL IN MISSING IMAGE DATA FOR THE STRUCTURE LAYER, THE FURNITURE LAYER, AND THE PRODUCT LAYER

330
CORRECT BLEMISHED IMAGE DATA FOR THE FIRST OBJECTS, THE SECOND OBJECTS, AND THE THIRD OBJECTS

340
LINK THE STRUCTURE LAYER WITH THE FIRST OBJECTS, THE FURNITURE LAYER WITH THE SECOND OBJECTS, THE PRODUCT LAYER WITH THE THIRD OBJECTS TO THE 3D IMAGE DATA SET AS AN EXTENSIBLE IMAGE DATA MODEL

350
PROVIDE THE EXTENSIBLE IMAGE DATA MODEL TO AT LEAST ONE OF A SIMULATION INTERFACE TO SIMULATE LAYOUT CHANGES IN THE PHYSICAL ENVIRONMENT OF THE STORE AND VIRTUAL REALITY (VR) OR AUGMENTED REALITY (AR) INTERFACE TO PROVIDE A VR OR AR SHOPPING SESSION FOR THE STORE

360
UPDATE A PRODUCT CATALOGUE ASSOCIATED WITH THE STORE WITH A LINK TO THE EXTENSIBLE DATA MODEL

311
GENERATE THE 3D IMAGE DATA SET USING AT LEAST IMAGE DEPTH DATA ORIGINALLY CAPTURED BY CAMERAS FOR THE PHYSICAL ENVIRONMENT OF THE STORE

312
IDENTIFY ANCHOR POINTS DEPICTED WITHIN THE 3D IMAGE DATA SET TO SUPPORT THE VR OR AR INTERFACE

313
SEPARATE THE FIRST OBJECTS, THE SECOND OBJECTS, AND THE THIRD OBJECTS IN A CORRESPONDING LAYER WITHOUT THE CORRESPONDING LAYER INCLUDING ANY OVERLAPPING OBJECTS THAT DO NOT BELONG IN THE CORRESPONDING LAYER

321
INTERPOLATE EACH OBJECT OF A CORRESPONDING LAYER TO PROVIDE THE MISSING IMAGE DATA WITHIN THE CORRESPONDING LAYER

331
CORRECT THE BLEMISHED IMAGE DATA CORRESPONDING TO A BLEMISHED OBJECT IN EACH CORRESPONDING LAYER USING MODEL IMAGE DATA OBTAINED FOR THE BLEMISHED OBJECT

341
CREATE AN OBJECT HEIRARCHY, WITHIN THE EXTENSIBLE IMAGE DATA MODEL, COMPRISING A STORE OBJECT FOR THE 3D IMAGE DATA SET, A STRUCTURE LAYER OBJECT COMPRISING A FIRST COLLECTION OF THE FIRST OBJECTS, A FURNITURE LAYER OBJECT COMPRISING A SECOND COLLECTION OF THE SECOND OBJECTS, A PRODUCT LAYER OBJECT COMPRISING A THIRD COLLECTION OF THE THIRD OBJECTS, EACH OF THE FIRST OBJECTS, EACH OF THE SECOND OBJECTS, AND EACH OF THE THIRD OBJECTS

FIG. 3

EXTENSIBLE IMAGE MODELING FOR SERVICES

BACKGROUND

Real world interactions are limited by real world physics. In order to understand the look and feel of a physical space, it is necessary to deploy a large amount of physical labor to reorganize that space. This is iterative and labor intensive for each permutation of the physical space that needs to be evaluated.

SUMMARY

In various embodiments, a system, and methods for extensible image modeling for services are presented. Three-dimensional (3D) images of a physical environment are obtained. The 3D images are modeled as a 3D data set and real-world objects depicted in the 3D data set are categorized into independent layers of the physical environment. Each layer is stripped of any corresponding overlapping objects of a different layer. Each object is modified or enhanced, when necessary, to fill in missing image information which was obfuscated by overlapping objects. Each object's image data is corrected to fix blemishes based on model object image data and the image data depicted in the corresponding layer. The corrected image data from the layers is updated into the 3D data set as a model 3D data set. The model 3D data set and layers are associated together as an extensible image model of the physical environment for which the objects and layers are independently manipulated for purposes of simulating different layouts of the objects within the physical environment and for purposes of providing virtual reality (VR) or augmented reality (AR) shopping sessions to users or shoppers.

BRIEF DESCRIPTION OF THE DRAWINGS

FIG. 2 is a flow diagram of a method for extensible image modeling for services, according to an example embodiment.

FIG. 3 is a flow diagram of another method for extensible image modeling for services, according to an example embodiment.

DETAILED DESCRIPTION

Figure 1:
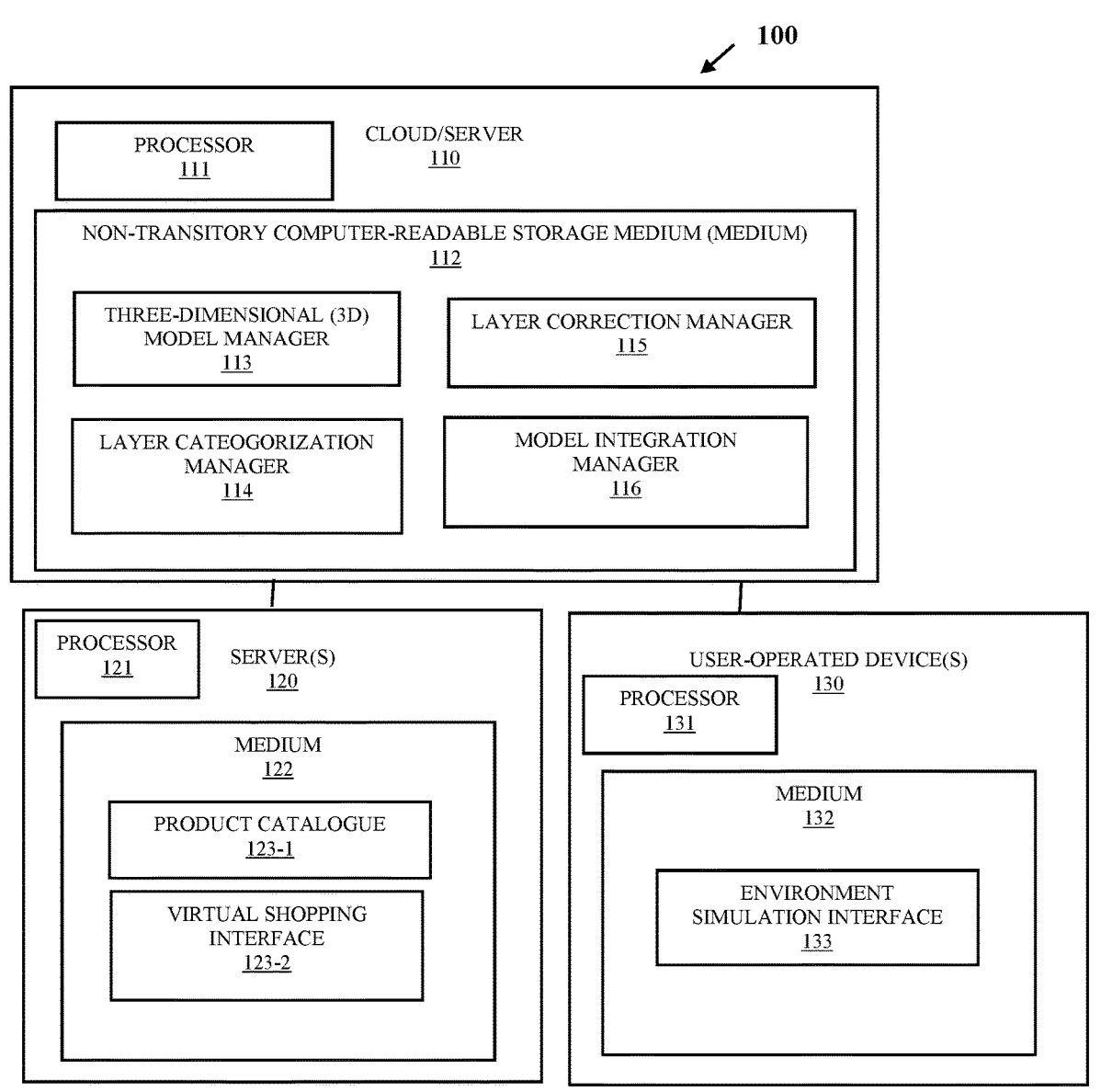
FIG. 1 is a diagram of a system of extensible image modeling for services, according to an example embodiment.

In order to go shopping in an environment where a user can interact with a product in a manner that is more than just viewing flat pictures on a screen, the user must physically travel to a store. Today the only way a shopper can have an "at-scale" retail experience, the shopper must be physically present within the retail environment.

Furthermore, retailers invest a lot of resources in order to optimize their physical environments. Studies have shown that product placement and product displays within stores can dramatically improve sales and improve operating efficiencies. Consumers preferences and business conditions change over time and are not static, which means retailers must continuously evaluate the physical layouts of their stores and update them when it is appropriate to do so. A physical store layout change believed to be optimal may actually end up being worse than the original store layout, which forces the retailer to move back to the original store layout, resulting in tremendous, wasted labor expense.

The aforementioned issues are obviated with the teachings provided herein and below. A three dimensional (3D) mapping of a physical environment is obtained. The 3D model is filtered to categorize the imaged environment into layers corresponding to the physical environment. Each layer is separated into its own independent model. Gaps detected within the physical environment for each independent model are filled in by interpolation and blemishes corrected in the corresponding model. Links to the 3D model and the independent models are provided to systems and services.

In an embodiment, interpolation includes using 3D image data and/or 2D image data to generate and fill in gaps in the 3D data set. In an embodiment, a generative fill feature of an existing tool, such as Photoshop® is used to interpolate the 3D and/or 2D image data to fill in missing data. In an embodiment, the interpolation includes using 3D coordinates x, y, z and red-green-blue (RGB) color data (e.g., a 3D model/mesh and a color texture mapped over it).

In an embodiment, an interface is provided to simulate proposed changes to the environment by removing one or more layers from the 3D model and reorganizing objects of any given layer. In an embodiment, the links to the 3D model and the independent models are updated to a product catalogue of a store and processed by a virtual shopping interface of the store to provide a real-world shopping experiences to customers of the store.

As used herein an "object" is an image-based depiction of a real-world surface, structure, or item. For example, an object can be an image depiction of a floor, a wall, a ceiling, a doorway, a door, a window sill, a window, a display table, a chair, a counter, a terminal, a product/item, etc.

FIG. 1 is a diagram of a system 100 of extensible image modeling for services, according to an example embodiment. Notably, the components are shown schematically in greatly simplified form, with only those components relevant to understanding of the embodiments illustrated.

Furthermore, the various components illustrated in FIG. 1 and their arrangement are presented for purposes of illustration only. Notably, other arrangements with more or less components are foreseeable without departing from the teachings of extensible image modeling for services as presented herein and below.

The system 100 includes a cloud 110 or a server 110 (herein after just "cloud 110"), one or more retail servers, and one or more user-operated devices 130. Cloud 110 includes a processor 111 and a non-transitory computer-readable storage medium (herein after just "medium") 112, which includes executable instructions for a three-dimensional (3D) model manager 113, a layer categorization manager 114, a layer correction manager 115, and a model integration manager 116. The instructions when executed by processor 111 perform operations discussed herein and below with respect to 113, 114, 115, and 116. Medium 112 also includes a database or data store for non-volatile storage and management of image models.

Each server 120 includes a processor 121 and medium 122, which includes executable instructions for a virtual shopping interface 123-2. The instructions when executed by processor 121 perform operations discussed herein and below with respect to 123-2. Medium 122 further includes a database or data store and relevant interface for a product catalogue 123-1. The product catalogue 123-1 includes records for products of a retailer, each record includes a product identifier or code for a given product, a product description, a store identifier for each store having the product, a planogram identifier, a planogram location identifier, by store, for where the product is physically located or displayed within a given store based on a planogram associated with the planogram identifier, a product price, etc.

Each user-operated device 130 includes a processor 131 and a medium 132, which includes executable instructions for an environment simulation interface 133. The instructions when executed by the processor 131 perform operations discussed herein and below with respect to 133.

Initially, 3D model manager 113 obtains key anchor points defined within a given store's physical environment by predefined objects. The anchor points provide a point of reference for augmented reality (AR) and virtual shopping experiences provided for the environment. The anchor points permit virtual shopping interface 123-2 to calibrate a location of a user relative to the actual physical environment during a virtual shopping session.

3D model manager 113 obtains raw 3D image data for a given store's physical environment. In an embodiment, the raw 3D image data is light detection and ranging (lidar) image data captured by one or more stationary and/or mobile lidar-enabled cameras. In an embodiment, the raw 3D image data is captured by any stereo-enabled camera or set of cameras. In an embodiment, the raw 3D image data is any time-of-flight (TOF) enabled camera or set of cameras. In an embodiment, the raw 3D image data is captured from a plurality of or any combination of lidar, stereo, and/or TOF cameras. The raw 3D image data includes texture and/or color as well as depth data for the objects present within the store's physical environment.

3D model manager 113 converts the raw 3D image data into a 3D model data set for the store's physical environment. The 3D model data set is capable of being manipulated via existing 3D modeling tools.

Layer categorization manager 114 filters the 3D model data set for purposes of categorizing the objects depicted within the 3D model data set into different layers corresponding to the store by assigning image layer categories to each of the objects. This isolates the objects into image layer categories; objects of a same image layer category represent a single image layer depicted within the 3D model data set. For example, all object vertices are categorized as belonging to the structure of the store, furniture present within the structure, and products present on the furniture. The layers are predefined for the environment based on a store identifier for the store. In an embodiment, the structure are objects represented within the 3D model data set associated with the floor, walls, windows, aisles, rooms, doorways; the furniture are objects represented within the 3D model data set associated with shelves, tables, chairs, counters, terminals, refrigerated display cases; and the products are objects represented within the 3D model data set associated with products, advertisement materials, art, pictures, etc.

In an embodiment, the layer categorization manager 114 utilizes one or more machine learning models to identifying the layers and categorizes the objects to each of the layers. The machine learning model is provided the 3D model data set as input and returns as output each object along with a layer classification for each object and a confidence value indicating a degree or percentage to which the machine learning model believes its layer classification for a given object is correct In an embodiment, layer categorization manager 114 compares the confidence value against a threshold confidence value and any object's layer classification falling below the threshold confidence value is flagged for review and correction if needed. When a correction is made, the flagged object's layer classification is used to retrain and provide feedback to the machine learning model to improve accuracy of the machine learning model.

Once the layer categorization manager 114 has classified the objects depicted within the 3D model data set into the physical layers with any corrected classifications, the layer categorization manager 114 separates the objects into individual image layer models; for example, store structure objects, store furniture objects, and store product objects. The layer categorization manager 114 provides links to the 3D model data set and the layer models to the layer correction manager 115.

Layer correction manager 115 processes each layer model independently to fill in or add missing visual data that was obscured or missing from the original 3D model data set for the environment. In an embodiment, layer correction manager 115 processes one or more interpolation algorithms to provide modified image data for each of the layer models independently.

Once missing image data is corrected for the layer models, layer correction manager 115 processes the image data for each object within each layer to correct blemishes, such as dents from a surface that should be flat, scuff marks on the floor, lighting artifacts that should not be in the image such as shadows or glares, etc. In an embodiment, layer correction manager 115 identifies the image data that requires correction by comparing model 2D image data for each object against the corresponding object's image data within the corresponding layer model. In an embodiment, layer correction manager 115 obtains the object image data for a product layer from a product catalogue 123-1.

The layer correction manager 115 reinserts, the modified data from the layers back into the 3D model data set. Each of the layers are also updated with the filled-in missing data and corrected data. Model integration manager 116 obtains links to the modified and corrected 3D model data set and the modified and corrected layer models once layer correction manager 115 corrects the layer models using interpolation to fill in missing or incomplete image data and using model image data to correct blemishes in the image data. Layer integration manager 116 links and associates the enhanced 3D model image data set, the independent image layers, and the objects together as an extensible image data model for the physical environment.

Layer integration manager 116 uses application programming interfaces (APIs) to integrate the extensible image data model into a variety of interfaces. For example, layer integration manager 116 updates a given product catalogue 123-1 of a given retailer's server 120 with a link to the extensible image data model. This permits software services provided by the retailer to obtain, access, and process the extensible image data model. In an embodiment, model integration manager 116 provides a virtual shopping sessions to customers of a given retailer via virtual shopping interface 123-2.

In an embodiment, virtual shopping interface 123-2 includes an AR feature or option, which permits a user located within the physical environment to establish an AR session with the layer integration manager 116 for purposes of the user navigating through the physical environment with superimposed images of product and product information available through selection by the user of a given product appearing on a shelf via the user-operated device's touch interface. The AR session also allows the user to search for products and receive navigation instructions through the physical environment to the shelf or display location of a desired product.

Layer integration manager 116 also processes an API to provide an environment simulation interface 133 via a user-operated device 130. For example, Layer integration manager 116 renders an environment simulation interface 133 on user-operated device to allow a user to navigate, view, and rearrange objects depicted within a given physical environment into a candidate layout that is different from an initial and original layout defined in the extensible image data model. This allows the user to operate environment simulation interface 133 and interact with model integration manager 116 and simulate different candidate layouts for the objects of the environment.

In an embodiment, model integration manager 116 maintains the extensible image data model for structure, furniture, and products within a hierarchical relationship. Each of the enhanced layers are accessible from the hierarchy as independent data models. For example, each structure object for a single enhanced 3D model data set of the store's physical environment includes references to a single store entity object and the corresponding structure object. Each furniture object within an enhanced furniture independent layer includes references to the store object, a corresponding structure object, and the corresponding furniture object. Each product object within an enhanced product independent layer includes references to the store object, a corresponding structure object, a corresponding furniture object, and the corresponding product object. Notably, a given product object can include multiple references to different furniture objects within the hierarchy; for example, a candy item/product can appear on a display shelf adjacent to a checkout terminal and also separately appear on one or more additional shelves elsewhere within the store. Thus, any given product node, which is associated with the product layer within the hierarchy, can include one, two, or more than two parent furniture object references.

In an embodiment, the model integration manager 116 manages the extensible image data model collectively, individually, and/or in combinations. In other words, the model integration manager 116 obtains just the furniture layer devoid of any structure objects and devoid of any product layer objects for simulation and manipulation of just the furniture layer objects. The model integration manager 116 rearranges the furniture layer objects by superimposing the furniture layer objects atop the structure objects during a simulation session with a user through environment simulation interface 133. Alternatively, the model integration manager 116 obtains the structure layer devoid of any furniture and devoid of any product layer objects and superimposes a combination of the furniture objects with product objects atop the structure objects during a simulation session with the user via environment simulation interface 133. Still further, model integration manager 116 obtains the structure and furniture layer objects devoid of any product layer objects and permits simulation of product objects atop the furniture objects during a simulation session with the user via environment simulation interface 133.

In an embodiment, model integration manager 116 permits furniture layer objects to be imported into a different store's extensible image data model during a simulation session with a user via environment simulation interface 133. For example, a source store's extensible image data model can add new furniture layer objects obtained from a different store's extensible image data model during a simulation session with a user via environment simulation interface 133. In fact, a given store's structure layer objects can be imported into a simulation session for which a new store's layout is being simulated. This is useful when a planned store is being proposed for a retailer and the planned store includes a similar layout and size of its physical environment. Each of the structure, furniture, and product objects are independently movable, capable of being deleted, and/or capable of being imported from a different extensible image data model during a simulation session via environment simulation interface 133.

In an embodiment, model integration manager 116 provides the virtual shopping interface 123-2 via an online transaction system of a given retailer. That is, a customer of the retailer utilizes an existing shopping application or website to shop for products of a store of the retailer. The model integration manager 116 provides via an API, the virtual shopping interface 123-2 for the online shopping session to the customer by rendering a real-world view of the store's physical environment on a screen of a user-operated device 130. The virtual shopping interface 123-2 permits the user to virtually navigate the store, select products to place in an online shopping cart or virtual shopping cart, and checkout. When the user selects a given product on a shelf, a variety of product information accessible through the product catalogue 123-1 is presented to the user. The information includes, by way of example only, product description, product price, any product discounts or offers, nutritional information, product size and dimensions, product weight, product inventory available at the store, in-store product location by aisle and shelf, etc.

In an embodiment, model integration manager 116 provides an AR option or capability to the user for selection through the virtual shopping interface 123-2. When the AR option is selected, model integration manager 116 initiates an AR session with the user-operated device. This indicates to the model integration manager 116 that the user is physically within the store shopping. Images obtained through a camera of user-operated device 130 are streamed to model integration manager 116 and simultaneously presented on the screen of the user-operated device 130 to the user. Model integration manager 116 identifies anchor points from the real-time video and tracks the location of the user within the store relative to the detected anchor points. When a user taps on a product, the product is oversized within the view on the user-operated device 130 and additional options are presented for selection by the user, such as product description, product price, any product discounts or offers, nutritional information, product size and dimensions, product weight, product inventory available at the store, in-store product location by aisle and shelf, etc. The model integration manager 116 also provides route guidance from the user's current location within the store to a selected product on the screen via the virtual shopping interface 123-2. The route guidance includes superimposed arrows directing the user to the product within the store and/or audible spoken guidance provided through a speaker of the user-operated device 130.

In an embodiment, the model integration manager 115 provides a virtual shopping session and/or an AR shopping session to the user via a virtual reality (VR) and/or AR headset. In this scenario, the user walks in place or within a predefined area to virtually traverse or navigate the shore while shopping using the headset, any VR or AR input device, and/or speech to select products, move about the virtual store, and obtain information about the products.

System 100 provides an extensible image data model that supports physical environment layout simulation and rearranging real-world objects from original layouts into proposed layouts via environment simulation interface 133. This allows rapid prototyping of different proposed physical environment layouts before resources are needed to make a proposed layout changes to the physical environment. System 100 also provides the extensible image data model that supports VR and AR shopping experiences to users via virtual shopping interface 123-2. This provides a competitive advantage to brick-and-mortar stores to reach customer who prefer online shopping or who prefer to review the store online before visiting the store for purchases.

The above-referenced embodiments and other embodiments are now discussed with reference to FIGS. 2 and 3. FIG. 2 is a flow diagram of a method 200 for extensible image modeling for services, according to an example embodiment. The software module(s) that implements the method 200 is referred to as an "extensible image model integrator." The extensible image model integrator is implemented as executable instructions programmed and residing within memory and/or a non-transitory computer-readable (processor-readable) storage medium and executed by one or more processors of one or more devices. The processor(s) of the device(s) that executes the extensible image model integrator are specifically configured and programmed to process the extensible image model integrator. The extensible image model integrator has access to one or more network connections during its processing. The connections can be wired, wireless, or a combination of wired and wireless.

In an embodiment, the device that executes the extensible image model integrator is cloud 110 or server 110. In an embodiment, server is a server 120 of a given retailer that manages multiple stores. In an embodiment, multiple devices execute the extensible image model integrator including cloud 110, server 120, user-operated devices 130, and/or transaction terminals of stores. In an embodiment, transaction terminals are self-service terminals or a point-of-sale terminals. In an embodiment, the extensible image model integrator is some, all, or any combination of, 3D model manager 113, layer categorization manager 114, layer correction manager 115, model integration manager 116, virtual shopping interface 123-2, and/or environment simulation interface 133.

At 210, the extensible image model integrator generates a 3D image data set of a physical environment. In an embodiment, the physical environment is a store of a retailer. In an embodiment, the physical environment is a warehouse of a retailer. In an embodiment, the physical environment is a conference center or venue.

In an embodiment, at 211, the extensible image model integrator obtains depth image data from one or more cameras, which captured the depth image data for the physical environment. In an embodiment, the one or more cameras are TOF sensors or cameras, lidar cameras, and/or depth-enabled cameras.

At 220, the extensible image model integrator categorizes objects depicted in the 3D image data set into independent image layers or independent layers. In an embodiment, at 221, the extensible image model integrator obtains identifiers for the independent layers based on an environment identifier for the physical environment. That is, the extensible image model integrator supports multiple different physical environments, and each physical environment includes its own predefined independent layers.

In an embodiment of 221 and at 222, the extensible image model integrator provides the identifiers for the independent layers and the 3D image data set as input to a machine learning model. The extensible image model integrator receives a layer classification for each object as output from the machine learning model.

In an embodiment of 222 and at 223, the extensible image model integrator flags certain objects that received a confidence value from the machine learning model below a threshold value. This is an indication that the layer classification provided by the machine learning model is potentially inaccurate. In an embodiment of 223 and at 224, the extensible image model integrator receives corrected layer classifications for the certain objects and uses the corrected layer classifications as feedback to train the machine learning model to improve the object layer classification accuracy of the machine learning model in subsequent iterations of the extensible image model integrator.

At 230, the extensible image model integrator, for each independent layer and each object, corrects image data missing or blemished in the corresponding object. In an embodiment, at 231, the extensible image model integrator removes overlapping objects associated with different layers from each independent layer. In an embodiment of 231 and at 232, the extensible image model integrator stores the objects categorized within a same layer together as a certain independent layer. In an embodiment of 232 and at 233, the extensible image model integrator interpolates one or more of certain 3D image data, certain 3D coordinates, 2D image data, and RGB color data and further adds image data determined to be missing from the certain image data for each object of each independent layer. In an embodiment of 233 and at 234, the extensible image model integrator corrects any image data determined to depict blemished image data using model image data for a corresponding object of each layer.

FIG. 3 is a flow diagram of another method 300 for extensible image modeling for services, according to an example embodiment. The software module(s) that implements the method 300 is referred to as a "physical store simulator." The physical store simulator is implemented as executable instructions programmed and residing within memory and/or a non-transitory computer-readable (processor-readable) storage medium and executed by one or more processors of one or more devices. The processor(s) of the device(s) that executes the physical store simulator are specifically configured and programmed to process the physical store simulator. The physical store simulator has access to one or more network connections during its processing. The connections can be wired, wireless, or a combination of wired and wireless.

In an embodiment, the device that executes the physical store simulator is cloud 110 or server 110. In an embodiment, server is a server 120 of a given retailer that manages multiple stores. In an embodiment, multiple devices execute the physical store simulator including cloud 110, server 120, user-operated devices 130, and transaction terminals of stores. In an embodiment, terminals are a self-service terminals or a point-of-sale terminals. In an embodiment, the extensible image model integrator is some, all, or any combination of, 3D model manager 113, layer categorization manager 114, layer correction manager 115, model integration manager 116, virtual shopping interface 123-2, environment simulation interface 133, and/or method 200. In an embodiment, the physical store simulator presents another, and in some ways, an enhanced processing perspective to that which was discussed above for operations of system 100 of FIG. 1 and for method 200 of FIG. 2.

At 310, physical store simulator separates object depicted in a physical environment for a store within a 3D image data set into a structure layer having first objects, a furniture layer having second objects, and a product layer having third objects. That is, the physical store simulator identifies objects depicted within the 3D image data set and classifies the objects into one of the three independent image layers.

In an embodiment, at 311, the physical store simulator generates the 3D image data set at least using image depth data originally captured by cameras for the physical environment of the store. In an embodiment of 311 and at 312, the physical store simulator identifies anchor points or anchor objects depicted within the 3D image data set to support a VR and/or an AR interface 123-2. In an embodiment of 312 and at 313, the physical store simulator separates the first objects, the second objects, and the third objects in a corresponding image layer without the corresponding layer including any overlapping objects that do not belong in the corresponding layer.

At 320, the physical store simulator fills in missing image data and/or 3D image data for the structure layer, the furniture layer, and the product layer. In an embodiment of 313 and 320, at 321, the physical store simulator interpolates each object of a corresponding layer to provide the missing image data within the corresponding image layer.

At 330, the physical store simulator corrects blemished image data for the first objects, the second objects, and the third objects. In an embodiment of 321 and 330, at 331, the physical store simulator corrects the blemished image data corresponding to a blemished object in each corresponding layer using model image data obtained for the blemished object. In an embodiment, a model image data for a product object of the product image layer is obtained from a product catalogue 123-1 associated with the store.

At 340, the physical store simulator links the structure layer with the first objects, the furniture layer with the second objects, product layer with the third objects to the 3D image data set as an extensible image data model. In an embodiment, at 341, the physical store simulator creates an object hierarchy, within the extensible image data model. The hierarchy includes a store object for the 3D image data set, a structure layer object including a first collection of the first objects, a furniture layer object including a second collection of the second objects, a product layer object include a third collection of the third objects, each of the first objects, each of the second objects, and each of the third objects.

At 350, the physical store simulator provides the extensible image data model to at least one of a simulation interface 133 to simulate layout changes in the physical environment of the store and a VR or an AR interface 123-2 to provide a VR or an AR shopping session for the store. In an embodiment, a VR interface 123-2 includes a user selectable option to change a VR shopping session into an AR shopping session.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

generating a three-dimensional (3D) image data set of a physical environment;

categorizing objects depicted in the 3D image data set into independent layers, wherein categorizing further includes obtaining identifiers for the independent layers based on an environment identifier associated with the physical environment, wherein obtaining further includes providing the identifiers and the 3D image data set as input to a machine learning model and receiving a layer classification for each object as output from the machine learning model, and wherein providing further includes flagging certain objects that received a confidence value from the machine learning model below a threshold value;

for each independent layer and each object, correcting missing or blemished image data to obtain corrected image data;

updating the 3D image data set with the corrected image data of the independent layers;

associating the updated 3D image data set and the independent layers as an extensible image data model for the physical environment; and integrating access to the extensible image data model within a service.

2. The method of claim 1, wherein generating further includes at least using depth image data from one or more cameras that originally captured the depth image data of the physical environment.

3. The method of claim 1, wherein flagging further includes receiving corrected layer classifications for the certain objects and using the corrected layer classifications as feedback to train the machine learning model.

4. The method of claim 1, wherein correcting further includes removing overlapping objects associated with different layers from each independent layer.

5. The method of claim 4, wherein removing further includes storing the objects categorized within a same layer together as a certain independent layer.

6. The method of claim 5, wherein storing further includes interpolating one or more of certain 3D image data, certain 3D coordinates, certain two-dimensional (2D) image data, and certain red-green-blue (RGB) color data and further generating and adding image data determined to be missing from the 3D image data for each object of each independent layer.

7. The method of claim 6, wherein interpolating further includes correcting any image data determined to depict blemished image data using model image data for a corresponding object of each independent layer.

* * * * *